Patented May 30, 1939

2,160,172

UNITED STATES PATENT OFFICE 2,160,172

POLYMER COMPOSITION

Raphael Rosen, Elizabeth, and Robert M. Thomas, Union, N. J., assignors to Standard Oil Development Company, a corporation of Delaware No Drawing. Application July 25, 1936, Serial No. 92,506

10 Claims. (Cl. 260—84)

The present invention relates to valuable polymerized substances, especially hydrocarbon polymers of high molecular weight which are stabilized against depolymerization caused by moderate heating. The invention will be fully understood from the following description.

Valuable polymers of high molecular weight can be prepared from olefins, especially iso-olefins, such as isobutylene, styrol, indene and similar compounds. These polymers are of the type known as linear or chain polymers, and this is because the polymerization proceeds linearly to produce chains of enormous length without ring formation. The polymers of isobutylene, which are the most desirable, contain no ring structure whatever. While those prepared from styrol and indene contain rings, these rings were present in the original structure of the polymerizable constituent and were not formed or altered during the polymerization.

The polymers mentioned above and those of isobutylene in particular, are quite sensitive to breakdown on moderate heating. The breakdown is not a heterogeneous cracking, but is a true depolymerization in which the original polymerized constituent is regenerated. Such instability has marked advantages in certain respects and for certain uses because the polymers, instead of cracking to leave a solid carbonaceous residue, depolymerize to gas or volatile liquid. While this is an extremely desirable property, it has been deemed advantageous to raise the temperature range in which decomposition occurs and to increase the time required for such decomposition. While the polymers as now produced are stable for several hours at 100° C. it is found that on heating for a sufficient time, depolymerization is clearly evident by loss of weight of the polymer, and the general lowering of the molecular weight of the residue.

At higher temperatures, say of 125° to 150° C., depolymerization is much more rapid. It has now been found that the addition of relatively small amounts of certain materials greatly delays the rate at which depolymerization proceeds at any temperature, and apparently considerably raises the threshold value at which depolymerization becomes evident. The materials employed comprise generally small amounts of aromatic compounds of a phenolic nature. The term "phenolic" is used in a broad sense to include materials in which a hydrogen atom is attached to the aromatic ring through an atom selected from among the negative elements from the sixth group of the periodic system.

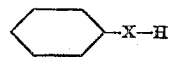

in which X represents an atom of oxygen, sulfur, selenium or tellurium. Of these materials, those containing sulfur and oxygen are the most desirable, not only because of the cheapness and greater ease of production, but also because they are more effective for the purpose in hand. Among such materials, the phenols, such as oxy- or thio-phenols, may be used, but it is preferred to use alkylated phenols or alkylated thio-phenols in order to increase the ease of incorporation and the amount that can be added.

It is also found desirable to use substances which contain additional atoms of oxygen or sulfur, that is to say, in addition to the —OH or —SH groups making the phenol or thio-phenol.

The additional oxygen atom may be present in the form of an additional hydroxyl group, as in the case of polyhydroxyl phenols or naphthols. But it may likewise be present in the form of an ether, that is to say, between two carbons containing radicals. In ethers of this sort one of the carbon containing radicals may be the aromatic ring on which the —OH or —SH group is attached. The other may be a similar group or it may be another aromatic group unsubstituted, or alkylated, or containing a —SH group as desired. It may also be a simple aliphatic group.

In the case where the additional atom is one of sulfur, it will be understood that it may comprise an additional —SH group as in the poly-thio-phenols. It may likewise be in the form of a sulfo-ether, that is to say, an ether in which the oxygen is substituted by a sulfur atom, i. e. monosulfide. Other compounds similar to the oxygen compounds mentioned above may be used in the same manner. It will be understood that disulfides may be used instead of monosulfides. The aromatic nuclei may contain other substitutes such as hydroxyl amino or carboxyl groups and halogen atoms.

In order to more clearly indicate the types of materials that can be used, the following formulae are given, but it will be understood that these are not to be taken as limitative, but only as illustrations of the types of compounds that can be used. Other coming within the broad definitions given above are equally satisfactory.

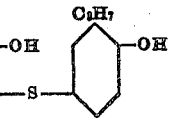
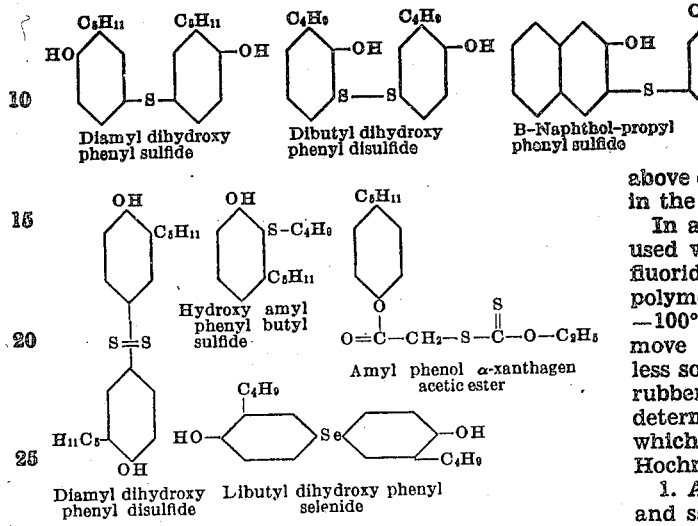

Diamyl dihydroxy phenyl sulfide

Dibutyl dihydroxy phenyl disulfide

B-Naphthol-propyl phenyl sulfide

Hydroxy amyl phenyl butyl sulfide

Amyl phenol α-xanthagen acetic ester

Diamyl dihydroxy phenyl disulfide

Libutyl dihydroxy phenyl selenide

The polymers above may be prepared by any desired method, for example, polymerization may be effected by means of sulfuric acid, especially at very low temperatures, −10° C., or with aluminum chloride and similar catalysts of the same type such as boron fluoride or titanium fluoride. It is equally desirable in producing these polymers to use low temperatures, as in general the lower the temperature used the higher the molecular weight will be produced. Other polymerization catalysts such as clays, aluminous materials and active carbon can also be used under suitable conditions which have been disclosed before. It is important to add the stabilizing agents mentioned above to the polymer after it has been produced and not to the original materials before polymerization because it has been found that the presence of the materials, prevents or greatly decreases the rate of polymerization, and the molecular weights that can be obtained by polymerization. The amount of the material added may be quite small but varies with the particular polymer with which it is used and the degree of increased stability desired. It is also desirable to increase the amount of the agent added, where higher molecular weight polymers are to be employed. In general, however, the amount of the material is less than 5% and may be even as low as .01%.

In order to avoid misunderstanding, it should be emphasized that the decomposition referred to above is not in any sense the result of oxidation, and the materials are not intended to and do not act as oxidation inhibitors, although it is known that most of them do act in such a manner in oils requiring such substances. The polymers, however, utilized in these compositions are extremely resistant to oxidation and ordinarily do not require any such protection against oxidation. The type of decomposition referred to in this case is strictly a depolymerization and is caused by the heat alone, whether in the presence or absence of air or oxygen. The polymers are substantially saturated and act like saturated substances in respect to oxidation. They do not appear to be subject to auto-oxidation. It has been found that the polymers mentioned herein decompose by depolymerization at temperatures above 100° C., whether in the presence or in the absence of oxygen, and that the stabilizing agents disclosed above decrease the depolymerization rate whether in the presence or in the absence of oxygen.

In all of the following examples, the polymers used were only prepared by the action of boron fluoride on highly purified liquid isobutylene. The polymerization was conducted at a temperature of −100° C., and the polymer after washing to remove the excess catalyst, was a white or colorless solid mass that had the appearance of crepe rubber. It had a molecular weight of 140,000 as determined by Staudinger's viscosity method which is described in Staudinger's book "Die Hochmolarkulen Verbindungen".

1. A sample of the polymer mentioned above, and samples to which tertiary amyl phenol sulfide and tertiary amyl phenol disulfide were added, respectively, in concentration of .1% were heated at 100° C. for extended periods. The molecular weight was measured on the product after the heating period and the decomposition and the results of these tests are found in the table below:

| Sample | Temp. of test, °C. | Time of heating, hrs. | Mol. weight after test |
|---|---|---|---|
| Polymer 140,000 mol. wt. | 100 | 64 | 9,000 |
| Polymer 140,000 mol. wt.+.1% tertiary amyl phenol sulfide | 100 | 400 | 124,000 |
| Polymer 140,000 mol. wt.+.1% tertiary amyl phenol disulfide | 100 | 400 | 120,000 |

The above results show that the polymer as prepared breaks down to a great extent in 64 hours at a temperature of 100° C. but the same polymer containing the addition of .1% of either of the two addition agents showed little decomposition for over 400 hours at the same temperature.

2. In order to obtain comparative results more quickly and at higher temperature, the above tests were repeated at 127° C. in the absence of air:

| Sample | Temp. of test, °C. | Time of heating, hrs. | Mol. weight after test |
|---|---|---|---|
| Polymer 140,000 mol. wt. | 127 | 3 | 34,000 |
| Polymer 140,000 mol. wt.+.1% tertiary amyl phenol sulfide | 127 | 3 | 130,000 |
| Polymer 140,000 mol. wt.+.1% tertiary amyl phenol disulfide | 127 | 8 | 36,000 |
| Polymer 140,000 mol. wt.+.2% tertiary amyl phenol sulfide | 127 | 8 | 121,000 |

The above shows that decomposition is much more rapid at 127° C. than at 100° C., and further that .1% of the addition agent is satisfactory to substantially prevent decomposition for about three hours, but that after that time decomposition becomes rapid. By doubling the amount of addition agents protection is extended to the 8 hour period.

3. In the following tests other addition agents were used:

| Sample | Temp. of test, °C. | Time of heating, hrs. | Mol. weight after test |
|---|---|---|---|
| Polymer 140,000 mol. wt. | 127 | 3 | 34,060 |
| Polymer 140,000 mol. wt.+.1% tertiary amyl phenol | 127 | 3 | 56,000 |
| Polymer 140,000 mol. wt.+.5% beta thio naphthol | 127 | 8 | 90,000 |

These tests show that the simple phenols and the thio-phenols are effective, but also indicate that the thio-phenols are more desirable than the phenols, and further that neither are as effective as the materials used in the previous examples.

4. In the following examples, tests were made at 150° C. at which decomposition was quite rapid:

| Sample | Temp. of test, °C. | Time of heating, hrs. | Mol. weight after test |
|---|---|---|---|
| Polymer 140,000 mol. wt. | 150 | 3 | 92% loss; residue an oily material. |
| Polymer 140,000 mol. wt.+.1% tertiary amyl phenol sulfide. | 150 | 3 | 12% loss by wt.; residue 48,000 m. w. |

While the above invention is partciularly useful and has been illustrated for use in connection with synthetic polymers, it will be understood that the addition agents may also be used with modified natural polymers, such as hydrogenated rubber or guttas and balatas, and with hydrogenated polymers of diolefins such as isoprene and butadiene.

The present compositions may be used as such, or they may be used in connection with other compositions, for example, the heat stabilizing material may be used as an ingredient for a lubricating composition, such as oils and greases, or for various other uses to which the ordinary polymers are susceptible.

The present invention is not to be limited to any theory of the action of the materials used nor to any particular polymers, but only to the following claims in which it is desirable to claim all novelty inherent to the invention.

What we claim is:

1. A polymer composition of increased stability toward heating, comprising a substantially saturated acyclic linear hydrocarbon polymer of high molecular weight normally resistant to oxidation and .01–5% of thio phenolic compound.

2. An improved polymer composition according to claim 1 in which the polymer is selected from the group consisting of substantially saturated polymers of iso-olefins, hydrogenated di-olefins, and hydrogenated natural rubber, gutta and balata, and a small quantity of an alkylated thiophenolic compound.

3. An improved polymer composition of increased stability toward moderate heating, comprising a substantially saturated linear hydrocarbon polymer of high molecular weight normally resistant to oxidation and a small quantity of aromatic sulfide containing a phenolic group.

4. A composition according to claim 3, in which the addition agent is a mono-sulfide.

5. A composition according to claim 3, in which the addition agent is an alkylated phenol mono-sulfide.

6. A composition according to claim 3, in which the addition agent is an aromatic disulfide.

7. A composition according to claim 3, in which the addition agent is an alkylated disulfide.

8. An improved polymer of high molecular weight and of increased stability toward heating, comprising a linear polymer of isobutylene and between .01 and 5% of a phenol sulphide.

9. A polymer composition comprising a high molecular weight linear polymer of isobutylene and .01–5% of tertiary amyl phenol sulfide.

10. The method of stabilizing high molecular weight substantially saturated linear hydrocarbon polymers normally resistant to oxidation, but normally subject at elevated temperatures to depolymerization resulting in substantial reduction of molecular weight, which comprises incorporating therein .01–5.0% of thio-phenolic compound.

RAPHAEL ROSEN.
ROBERT M. THOMAS.